United States Patent [19]

Severson et al.

[11] Patent Number: 5,701,755
[45] Date of Patent: Dec. 30, 1997

[54] COOLING OF AIRCRAFT ELECTRONIC HEAT LOADS

[75] Inventors: Mark Hamilton Severson; Steven Eric Squier, both of Rockford, Ill.

[73] Assignee: Sundstrand Corporation, Rockford, Ill.

[21] Appl. No.: 783,973

[22] Filed: Jan. 15, 1997

[51] Int. Cl.$^6$ .................................. F25D 9/00; F25B 9/00
[52] U.S. Cl. .................................. 62/402; 62/88
[58] Field of Search .................. 62/87, 88, 401, 62/402; 454/71, 74

[56] References Cited

U.S. PATENT DOCUMENTS

| | | | |
|---|---|---|---|
| 2,767,561 | 10/1956 | Seeger | 62/136 |
| 2,991,706 | 7/1961 | Best | 454/71 |
| 3,326,109 | 6/1967 | Markham | 98/1.5 |
| 4,262,495 | 4/1981 | Gupta et al. | 62/172 X |
| 4,283,924 | 8/1981 | Schütze | 62/402 |
| 4,334,411 | 6/1982 | Payne | 62/86 |
| 4,419,926 | 12/1983 | Cronin et al. | |
| 4,550,573 | 11/1985 | Rannenberg | 62/401 X |
| 4,684,081 | 8/1987 | Cronin | 244/58 |
| 4,875,345 | 10/1989 | Signoret | 62/402 |
| 5,014,518 | 5/1991 | Thomson et al. | 62/402 X |
| 5,150,585 | 9/1992 | Markiewicz | 62/402 X |
| 5,327,744 | 7/1994 | Frawley et al. | 62/402 X |
| 5,461,882 | 10/1995 | Zywiak | 62/401 |
| 5,462,110 | 10/1995 | Sarver | 62/402 X |
| 5,482,229 | 1/1996 | Asshauer | 454/74 X |
| 5,553,461 | 9/1996 | Hitzigrath et al. | 62/402 X |

*Primary Examiner*—Christopher Kilner
*Attorney, Agent, or Firm*—Wood, Phillips, VanSanten, Clark & Mortimer

[57] ABSTRACT

Improved cooling of electronic heat loads aboard aircraft is achieved in a system including a sealable aircraft cabin (10), first and second electronic heat loads (38), (40) and a means (42) for maintaining a desired pressure within the cabin (10). A rotatable turbine wheel (16) is associated with an overboard dump port (32) such that air being dumped overboard from the cabin is expanded to rotate the turbine wheel (16). A mechanical load (20) is connected to the turbine wheel (16) for harnessing the rotation thereof and means (24), (60) are employed for using the air expanded by the turbine wheel (16) for cooling at least one of the loads (38), (40).

13 Claims, 2 Drawing Sheets

COOLING OF AIRCRAFT ELECTRONIC HEAT LOADS

FIELD OF THE INVENTION

This invention relates to the cooling of aircraft heat loads, and more particularly, the heat loads posed by electronic systems carried on board sophisticated aircraft, utilizing cabin exhaust air and energy recovery.

BACKGROUND OF THE INVENTION

The packaging of modern avionics (electronic systems employed in aircraft) and aircraft power electronics require highly effective heat removal techniques. This is due to the fact that the improvements in such electronics generally has lead to substantial miniaturization. As a consequence, higher heat fluxes are present.

The avionics and power electronics cooling systems must maintain the electronic junction temperatures below predetermined limits to provide survivability under all operating conditions as well as to maintain high reliability during normal operation. As component reliability is based upon component time at a given temperature, temperature sensitive components should be maintained as cool as possible.

One type of conventional cooling system for aircraft power generation electronics utilizes cabin exhaust air as a heat sink. Heat is collected from several heat load locations by a pumped liquid loop and rejected to cabin air via a liquid/air heat exchanger. The cabin exhaust air is then simply dumped overboard, rejecting the waste heat with it. As the minimum temperature of electronic components cooled by such a cooling system is limited to the temperature of the heat sink, i.e., cabin air temperature, as a practical matter, it is impossible to further reduce the temperature of the cooling fluid. Therefore, additional cooling can be achieved only by increasing the mass flow rate of the coolant, the cabin exhaust air. However, this also is impractical as it would require increasing the fresh air flow to the cabin air stream which can be achieved only by increasing the amount of bleed air taken from the engines, or increasing the amount of ram air taken from the ambient. In the case of the former, engine operating costs are substantially increased while in the case of the latter, aerodynamic drag on the aircraft is increased, ultimately resulting in increased fuel consumption.

The present invention is directed to overcoming one or more of the above problems.

SUMMARY OF THE INVENTION

It is the principal object of the invention to provide a new and improved cooling system for aircraft electronic heat loads. More particularly, it is an object of the invention to provide a means of cooling such loads that utilizes cabin exhaust air, provides for energy recovery and is not limited by the cabin exhaust air temperature.

An exemplary embodiment of the invention achieves the foregoing in an aircraft electronics cooling system that includes a sealable aircraft cabin and first and second electronic heat loads, the first heat load requiring only a relatively high temperature coolant and the second heat load requiring a relatively low temperature coolant. Means are provided for maintaining a desired pressure in the cabin that includes a means for providing fresh air to the cabin and means for dumping exhaust air from the cabin overboard. A rotatable turbine wheel is associated with the dumping means such that air being dumped overboard is expanded to rotate the turbine wheel. Means are connected to the turbine wheel for harnessing the rotation thereof, the harnessing means including a mechanical load driven by the turbine wheel and means are provided for using the air expanded from the turbine wheel for cooling at least one of the loads. Because air expanded by the turbine will be at lower temperature than prior to it's expansion, an increased temperature differential over the prior art is obtainable to enhance the cooling of the load. Further, the harnessing means provides a means for recovering power from the exhaust airstream and harnessing it as, for example, for electric, pneumatic or hydraulic power generation.

Other objects and advantages will become apparent from the following specification taken in connection with the accompanying drawings.

DESCRIPTION OF THE PREFERRED EMBODIMENTS

Figure 1:
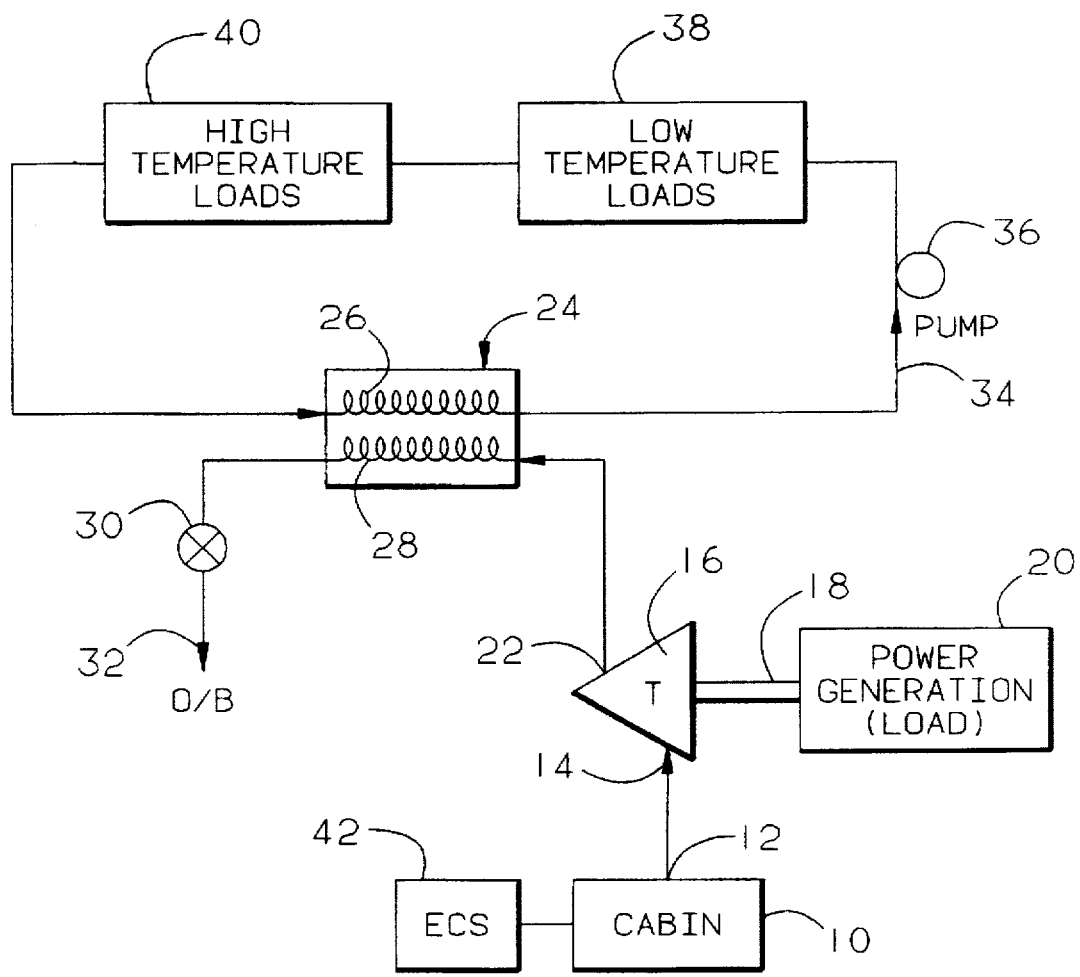
FIG. 1 is a schematic of one embodiment of a cooling system made according to the invention.

An exemplary embodiment of the invention is illustrated in FIG. 1. The sealable pressurized cabin of an aircraft is schematically shown at 10 and includes a cabin exhaust air port 12 which is connected to the inlet 14 of a turbine wheel 16. The turbine wheel 16 is coupled by a shaft 18 to a mechanical load shown schematically at 20. The load 20 is driven by the turbine wheel 16 and may be an electrical generator, a pneumatic power generator such as a compressor, or a hydraulic power generator such as a pump.

The outlet 22 of the turbine wheel 16 is connected to a heat exchanger, generally designated 24. The heat exchanger 24 includes a first fluid flow path 26 which is in heat exchange relation with a second fluid flow path 28. The turbine outlet 22 is specifically connected to the second fluid flow path which in turn is connected to an optional control valve 30 and then to a dump port 32 whereat the stream is dumped overboard of the aircraft.

The first fluid flow path is connected in a liquid coolant loop 34 which includes a pump 36 and first and second electronic loads. Specifically, one of the loads includes a so-called low temperature electronic load 38 and a second load is a so-called high temperature electronic load 40. The arrangement is such that the pumped liquid first flows through the low temperature electronic load 38 to cool the same and then is passed on to the high temperature electronic load 40 to provide cooling at that location as well. Thereafter, it is returned to the first fluid flow path 26.

The electronics in the loads 38 and 40 may take on a variety of forms. They may be those types of electronics normally used for navigation and referred to as avionics. Alternatively, they may include electronics for operation of the aircraft radar. As still another possibility, they may include power generation electronics such as those commonly found in inverters which are employed to provide a constant frequency alternating current power source.

In the usual case, those loads requiring temperature maintenance at the lowest temperatures to prevent deterioration and maintain reliability are a part of the low temperature electronic load 38. Those electronic components whose temperature sensitivity is not as great may make up the high temperature electronic load 40.

Returning to the cabin 10, the same is provided with a conventional environmental control system (ECS) 42 which acts to introduce fresh air into the cabin 10 at a desired pressure and temperature and typically will provide for some recirculation of the cabin air. As fresh air is admitted, it is necessary to exhaust cabin air and this is accomplished through the port 12. The exhaust cabin air at the port 12 contains energy inasmuch as it is pressurized by the ECS 42 to cabin pressure which will be above the ambient pressure on the exterior of the airplane at typical cruise altitudes. It also contains heat energy in the form of heat absorbed from cabin occupants and any other sources of heat within the cabin.

The exhaust stream is provided to the turbine 16 to drive the same to produce power by the mechanical load 20. As mentioned previously, the particular type of power may take on any desired form and the particular form and it's utilization form no part of the present invention.

The exhaust airstream is expanded by the turbine wheel 16 in the course of driving the load 20 and the expanded stream, now at a pressure scarcely above the ambient, and at a temperature considerably lower than that of the cabin 10 is provided to the heat exchanger 24 whereat it is brought in heat exchange relation with the liquid coolant flowing in the loop 34. The liquid coolant is cooled within the heat exchanger 24 and pumped first to the low temperature load 38 to cool the same and then to the high temperature load 40 to cool it before being returned to the heat exchanger 24 whereat it may reject the accumulated heat to the expanded cabin exhaust airstream which is ultimately dumped overboard at the port 32.

It will be appreciated that the temperature of the coolant 34 will be at it's lowest when it emerges from the heat exchanger 24. Consequently, the coolant will first be applied to the low temperature load 38 whereat it will be warmed somewhat as the load 38 rejects heat to it. Thereafter, the coolant will be applied to the high temperature load 40 to provide cooling of the same. The cooling will be adequate even though the temperature of the coolant has been increased somewhat by the low temperature load 38 since the high temperature load components may operate at somewhat higher temperatures than the components of the low temperature load 38 as mentioned previously.

Figure 2:
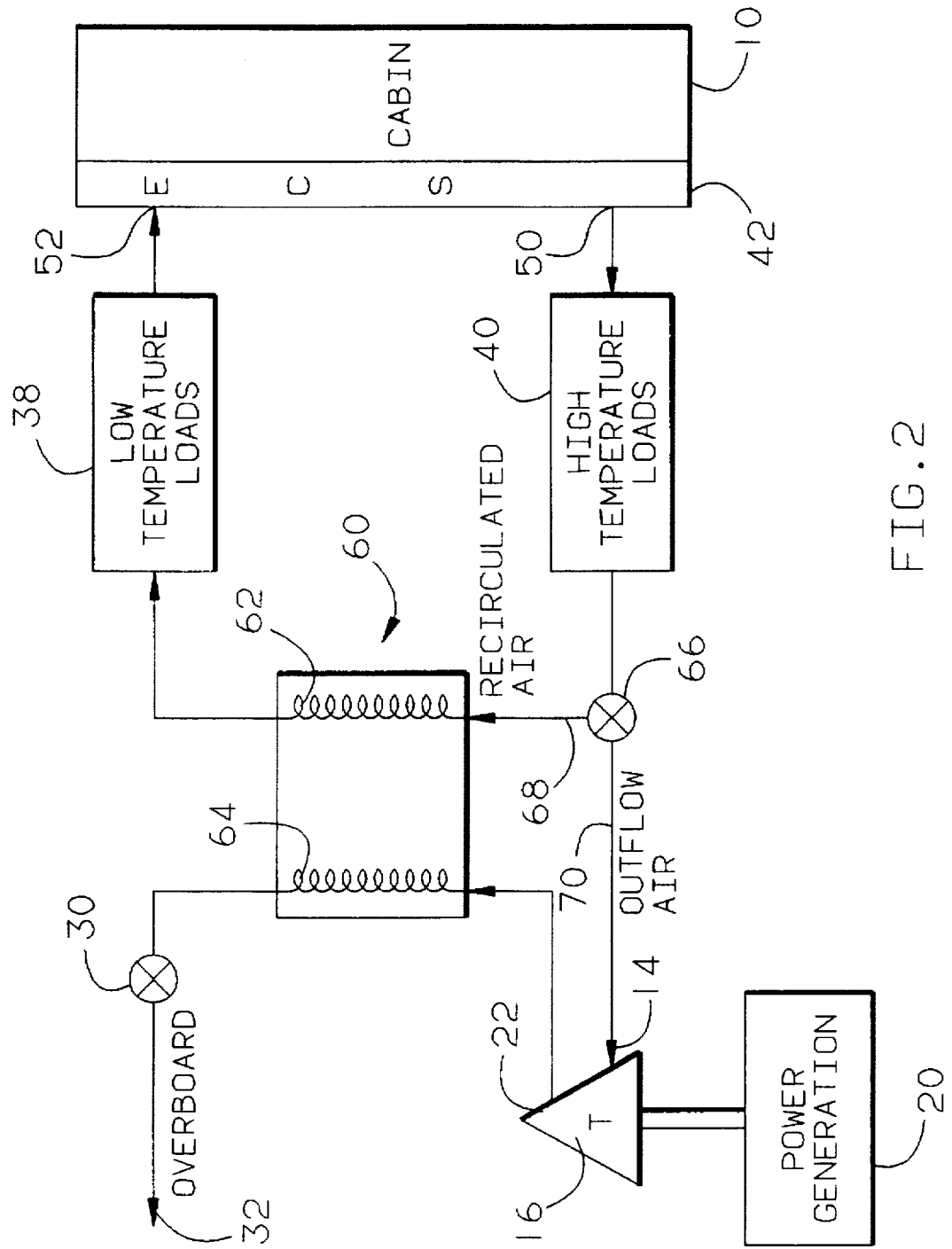
FIG. 2 is a schematic of a modified embodiment of the invention.

A modified embodiment is illustrated in FIG. 2. Where like components are employed, like reference numerals are utilized and in the interest of brevities, such components will not be redescribed.

In the embodiment of FIG. 2, the loads 38 and 40 are air cooled and the cabin includes an exhaust air outlet port 50 which is connected to the high temperature load 40. The cabin also includes a cabin air inlet port 52 which receives air from the low temperature load 38.

A heat exchanger, generally designated 60, includes a first fluid flow path 62 that interconnects the high temperature load 40 and the low temperature load 38. The first fluid flow path 62 is in heat exchange relation with a second fluid flow path 64 which is the exact counterpart of the second fluid flow path 28. The heat exchanger 60, unlike the heat exchanger 24 which is an air/liquid heat exchanger, is an air/air heat exchanger.

The system is completed by a flow controller 66 located on the upstream side of the first fluid flow path 62 and downstream of the high temperature load. The flow controller 66 acts to recirculate a certain amount of the cabin air received from the high temperature load 40 through a duct 68 to the heat exchanger 60. The remainder of the cabin air, that is, the cabin air that is to be exhausted, is passed via a duct 70 to the inlet of the turbine 14. In the usual case, the flow controller 66 will recirculate about 50% of the air received from the high temperature load 40 with the ECS 42 providing fresh air in a conventional fashion.

In operation, the cabin exhaust air passed to the duct 70 by the flow controller 66 is expanded by the turbine wheel 16, producing power via the power generating load 20 in the process. The cold, expanded, cabin exhaust air is passed through the second fluid flow path 64 of the heat exchanger 60 and heat is rejected to it by recirculated cabin air flowing in the first fluid flow path 62. After cooling the recirculated cabin air, the cabin exhaust air, whose flow may be controlled by the optional flow control valve 30, is dumped overboard to the exterior of the aircraft.

Because the expanded exhaust air 60 is at a much lower temperature after being expanded in the turbine 16 then before, it is possible to lower the temperature of the recirculated cabin air from what would conventionally be the case; and that is what occurs within the heat exchanger 60. As a result, an increased temperature differential may be achieved when this now cooled recirculated air is first passed to the low temperature load 38. Heat rejected by the low temperature load to the recirculated cabin air will frequently be sufficient so that, when mixed with incoming fresh air provided by the ECS 42, the recirculated cabin air will be at adequate and proper temperature for conditioning of the cabin 10.

After conditioning the cabin 10, the combined recirculating air and fresh air stream passes to the high temperature load 40 whereat it cools the same before being passed to the flow controller 66 so that the cycle may continue.

Again, it will be noted that the system provides a means of achieving a much colder temperature than the cooling fluid, here, recirculated cabin air, than is possible with the prior art system. Furthermore, by grouping the components, the less temperature critical components of the high temperature load 40 may be subject to the cabin airstream when it is at a relatively high temperature without adverse consequences.

Finally, by ducting the air to drive the turbine 16 at a location between the high temperature load 40 and the heat exchanger 60, the energy content of the exhaust air stream will be at it's highest, i.e., it will be at it's highest temperature, thereby providing for maximum delivery of useful work by the turbine wheel 16.

We claim:

1. An aircraft electronics cooling system comprising:

a sealable aircraft cabin;

first and second electronic heat loads, said first load requiring a relatively high temperature coolant and said second load requiring a relatively low temperature coolant;

means for maintaining a desired pressure within said cabin, including means for providing fresh air to said cabin and means for dumping exhaust air from said cabin overboard;

a rotatable turbine wheel associated with said dumping means such that air being dumped overboard is expanded to rotate said turbine wheel;

means connected to said turbine wheel for harnessing the rotation thereof, said harnessing means comprising a mechanical load driven by said turbine wheel; and means for using air expanded from said turbine wheel for cooling at least one of said loads.

2. The aircraft electronic cooling system of claim 1 wherein said harnessing means comprises a mechanical device selected from the group consisting of a generator, a compressor and a pump.

3. The aircraft electronic cooling system of claim 1 wherein said using means includes a heat exchanger having first and second fluid flow paths in heat exchange relation with each other; said first fluid flow path receiving a first fluid to be cooled and said second fluid flow path receiving expanded air from said turbine wheel to cool said first fluid; said at least one load being connected to said first fluid flow path.

4. The aircraft electronic cooling system of claim 3 wherein said first fluid is cabin air and said first fluid flow path is connected to said maintaining meads.

5. The aircraft electronic cooling system of claim 3 wherein both said loads are connected to said first fluid flow path to be cooled by said first fluid flow path.

6. The aircraft electronic cooling system of claim 5 wherein said first fluid is cabin air and said first load is connected to the upstream side of said first fluid flow path and said second load is connected downstream of said first fluid flow path.

7. The aircraft electronic cooling system of claim 5 wherein said first fluid is a liquid and said first and second loads are serially connected to the downstream side of said first fluid flow path with said second load located between said first fluid flow path and said first load, and a pump for recirculating the liquid in a loop including said loads and said first fluid flow path.

8. A cooling system for the electronics of an aircraft having a cabin pressurization system comprising:
- a turbine wheel connectable to the cabin to receive pressurized air therefrom and to be driven thereby;
- a dump port connected to the turbine wheel for dumping cabin air that has been expanded by the turbine wheel to the ambient;
- a rotatable load connected to the turbine wheel to be driven thereby;
- a heat exchanger having first and second fluid flow paths in heat exchange relation with one another, said second fluid flow path interconnecting said turbine wheel and said dump port;
- first and second electronics loads, including a low temperature electronic load and a high temperature electronic load, connected in a loop including said first fluid flow path; and
- a pump in said loop for recirculating a liquid coolant through said first flow path and then to said low temperature load and then to said high temperature load.

9. A cooling system for the electronics of an aircraft having a cabin pressurization system comprising:
- a turbine wheel connectable to the cabin to receive pressurized air therefrom and to be driven thereby;
- a dump port connected to the turbine wheel for dumping cabin air that has been expanded by the turbine wheel to the ambient;
- a rotatable load connected to the turbine wheel to be driven thereby;
- a heat exchanger having first and second fluid flow paths in heat exchange relation with one another, said second fluid flow path interconnecting said turbine wheel and said dump port;
- first and second electronics loads, including a low temperature electronic load and a high temperature electronic load, connected in a loop including said first fluid flow path and the cabin of an aircraft, said first fluid comprising cabin air; and
- means for diverting part of the cabin air from said loop to said turbine wheel to drive the same and for recirculating the remaining cabin air through said cabin and said first fluid flow path;
- whereby said diverted cabin air is expanded as it drives said turbine and then is brought by said second fluid flow path into heat exchange relation with said other cabin air in said first fluid flow path to cool said remaining cabin air.

10. The cooling system of claim 9 wherein said high temperature load is at a location in said loop downstream of said cabin and upstream of said first fluid flow path.

11. The cooling system of claim 9 wherein said low temperature load is at a location in said loop upstream of said cabin and downstream of said first fluid flow path.

12. The cooling system of claim 11 wherein said high temperature load is at a location in said loop downstream of said cabin and upstream of said first fluid flow path.

13. The cooling system of claim 9 wherein at least one of said loads is downstream of said cabin and upstream of said first fluid flow path and said diverting and recirculating means is located in said loop between said first fluid flow path and said at least one load;
- whereby said at least one load adds energy to said first fluid prior to its diversion to said turbine; hereby enabling the turbine to increase its output.

* * * * *